US012749322B2

(12) United States Patent
Nakamura

(10) Patent No.: US 12,749,322 B2
(45) Date of Patent: Sep. 29, 2026

(54) ELECTRONIC CONTROL UNIT AND OBJECT IDENTIFICATION METHOD

(71) Applicant: Hitachi Astemo, Ltd., Hitachinaka (JP)

(72) Inventor: Hirotaka Nakamura, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 319 days.

(21) Appl. No.: 18/705,988

(22) PCT Filed: Nov. 1, 2021

(86) PCT No.: PCT/JP2021/040237
§ 371 (c)(1),
(2) Date: Apr. 29, 2024

(87) PCT Pub. No.: WO2023/073987
PCT Pub. Date: May 4, 2023

(65) Prior Publication Data
US 2026/0141730 A1 May 21, 2026

(51) Int. Cl.
*G06V 20/58* (2022.01)
*G06T 7/246* (2017.01)
(Continued)

(52) U.S. Cl.
CPC .............. *G06V 20/58* (2022.01); *G06T 7/246* (2017.01); *G06V 10/25* (2022.01); *G06V 10/62* (2022.01);
(Continued)

(58) Field of Classification Search
CPC ........ G06V 20/58; G06V 10/25; G06V 10/62; G06T 7/246; G06T 2207/10028; G06T 2207/30252
See application file for complete search history.

(56) References Cited

U.S. PATENT DOCUMENTS 5,929,803 A 7/1999 Uehara et al.
11,748,897 B1 * 9/2023 Burgoyne ............... G06T 7/246 382/103
(Continued)

FOREIGN PATENT DOCUMENTS

JP 11-72557 A 3/1999
JP 2014/102256 A 6/2014
(Continued)

OTHER PUBLICATIONS

International Search Report issued in PCT Application No. PCT/JP2021/040237 dated Dec. 28, 2021, with English Translation.
(Continued)

*Primary Examiner* — Aaron W Carter
(74) *Attorney, Agent, or Firm* — Foley & Lardner LLP

(57) ABSTRACT

It is provided an electronic control unit comprising an arithmetic unit and a storage device, the electronic control unit includes a data acquisition module configured to acquire external environment data; a data storage module configured to accumulate the external environment data; a data superimposition module configured to superimpose pieces of external environment data, an object region candidate specification module configured to specify a candidate for a region in which an object is present in the superimposed pieces of external environment data; a feature extraction module configured to extract a feature of the specified candidate for the region in a feature amount time window; and an identification module configured to identify a peripheral object, wherein the identification module configured to compare the variation with time in the feature of the region to a predetermined threshold value and identify the object in the region based on a change in the feature.

10 Claims, 13 Drawing Sheets

(51) Int. Cl.
*G06V 10/25* (2022.01)
*G06V 10/62* (2022.01)

(52) U.S. Cl.
CPC ............... *G06T 2207/10028* (2013.01); *G06T 2207/30252* (2013.01)

(56) References Cited

U.S. PATENT DOCUMENTS

| | | | | |
|---|---|---|---|---|
| 2015/0243171 | A1* | 8/2015 | Emura | G06T 11/60 340/435 |
| 2017/0140509 | A1* | 5/2017 | Lee | G06T 5/50 |
| 2017/0193309 | A1* | 7/2017 | Kanda | G06V 20/52 |
| 2018/0309968 | A1* | 10/2018 | Tanaka | G03B 21/00 |
| 2019/0279026 | A1* | 9/2019 | Sato | G06N 3/084 |
| 2020/0134849 | A1* | 4/2020 | Blasco Claret | G06T 7/579 |
| 2020/0210680 | A1* | 7/2020 | Shreve | G06V 10/757 |
| 2022/0075077 | A1 | 3/2022 | Kato et al. | |
| 2023/0042968 | A1* | 2/2023 | Ding | G06T 7/70 |
| 2024/0371035 | A1* | 11/2024 | Jadhav | G01S 17/86 |
| 2025/0200761 | A1* | 6/2025 | Min | G06T 7/246 |

FOREIGN PATENT DOCUMENTS

| | | | |
|---|---|---|---|
| JP | 2016-206026 | A | 12/2016 |
| JP | 2017-187422 | A | 10/2017 |
| WO | WO-2021-019906 | A1 | 2/2021 |

OTHER PUBLICATIONS

Alex H. Lang, et al., "PointPillars: Fast Encoders for Object Detection from Point Clouds", Conference: 2019 IEEE/CVF Conference on Computer Vision and Pattern Recognition (CVPR), Jun. 2019.

* cited by examiner

ELECTRONIC CONTROL UNIT AND OBJECT IDENTIFICATION METHOD

BACKGROUND OF THE INVENTION

This invention relates to an electronic control unit, and more particularly, to an object identification technology suitable for an in-vehicle electronic control unit that detects an object.

In automatic driving and driving support for high-speed driving on an expressway or the like, it is important to accurately recognize an object present at a distance (of, for example, 150 meters or more). For example, when an object is detected by a LiDAR, observation points of a distant object are sparse, and hence it is difficult to recognize the object with high accuracy. In view of this, there have been proposed a method of superimposing (cluster) point clouds detected during a fixed time period and a method for superimposition in an absolute coordinate system in order to detect a stationary object.

The following related arts are known as background arts of this technical field. In JP 2017-187422 A, there is described a peripheral object recognition device including: a number-of-votes calculation unit that calculates, for each of grids of a grid map, the number of votes being the number of detection points included therein and obtained by a radar sensor based on results of detection of the detection points obtained by the radar sensor; a cluster setting unit that sets, on the grid map, a cluster being an object to be detected by clustering of the detection points based on the results of the detection of the detection points by the radar sensor; a grid discrimination unit that discriminates, based on a total value of the numbers of votes calculated a plurality of times for each grid, stationary grids and moving grids among grids occupied by the cluster; and a moving object determination unit that determines whether the cluster is a moving object or a stationary object based on arrangement of the stationary grids and the moving grids that are included in the grids occupied by the cluster.

In JP 2016-206026 A, there is described an object recognition system. In the object recognition system, each of irradiation regions is irradiated with a laser beam, the irradiation regions being obtained by segmenting a detection region for detecting an object in a grid pattern in a horizontal direction and a vertical direction in advance, a distance-measured point cloud including respective distances and reflection intensities obtained by receiving reflected light of the laser beam in the respective irradiation regions is acquired, the distance-measured point cloud is clustered, and a corrected cluster point cloud in which a position of the clustered point cloud (cluster point cloud) is corrected to a position set for each cluster is generated. Further, an integrated cluster point cloud at a current time, in which the corrected cluster point cloud at the current time obtained for each cluster is integrated into an integrated cluster point cloud at a past time obtained for each cluster in the past, is obtained, and identification is executed through use of the integrated cluster point cloud.

In the above-mentioned background arts, it is difficult to identify a stationary object and a moving object from each other. In particular, it is difficult to identify a small stationary object having a small number of observation points and a large moving object having a large number of observation points.

This invention has an object to accurately identify whether even a distant object having a small number of acquired point clouds is a stationary object or a moving object.

SUMMARY OF THE INVENTION

The representative one of inventions disclosed in this application is outlined as follows. There is provided an electronic control unit, comprising: an arithmetic unit configured to execute predetermined processing; a storage device that is accessible to the arithmetic unit; the electronic control unit includes a data acquisition module in which the arithmetic unit is configured to acquire external environment data obtained through observation by an external observation device; a data storage module configured to accumulate the external environment data; a data superimposition module in which the arithmetic unit is configured to superimpose pieces of external environment data at a plurality of times, which have been stored in the data storage unit; an object region candidate specification module in which the arithmetic unit is configured to specify a candidate for a region in which an object is present in the superimposed pieces of external environment data; a feature extraction module in which the arithmetic unit is configured to extract a feature of the specified candidate for the region in a feature amount time window including at least adjacent three times; and an identification module in which the arithmetic unit is configured to identify a peripheral object based on a variation with time in the extracted feature, wherein the identification module is configured to compare the variation with time in the feature of the region to a predetermined threshold value and identify the object in the region based on whether a change in the feature of the region is gradual.

According to the at least one aspect of this invention, it is possible to accurately identify a distant object having sparse point clouds. Problems, configurations, and effects other than those described above are clarified by the following description of embodiments.

DETAILED DESCRIPTION OF THE PREFERRED EMBODIMENTS

First Embodiment

Figure 1:
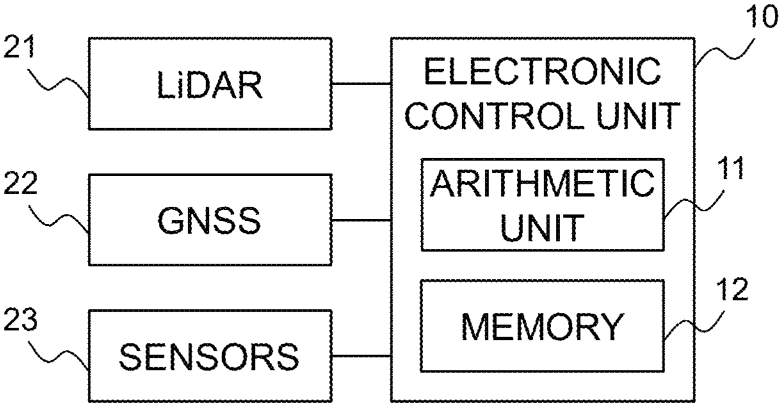
FIG. 1 is a block diagram for illustrating a configuration of an electronic control unit according to a first embodiment of this invention.

FIG. 1 is a block diagram for illustrating a configuration of an electronic control unit 10 according to a first embodiment of this invention. In the following description, like components are denoted by like reference symbols.

The electronic control unit 10 includes an arithmetic unit 11 and a memory 12, and includes a network interface (not shown) and an input and output interface (not shown).

The arithmetic unit 11 is a processor (for example, a CPU) that executes a program stored in a program area of the memory 12. The arithmetic unit 11 operates as a functional module that provides each of various functions by executing a predetermined program.

The memory 12 includes a ROM, which is a non-volatile storage element, and a RAM, which is a volatile storage element. The ROM stores an unchanging program (for example, BIOS) among others. The RAM is a dynamic random access memory (DRAM) or a similar high-speed and volatile storage element, and temporality stores a program executed by the arithmetic unit 11 and data used when the program is executed. The memory 12 is provided with a program area composed of a large-capacity and nonvolatile storage element such as a flash memory.

The network interface controls communication to/from another electronic control unit through a CAN or the Ethernet.

The input and output interface is coupled to a LiDAR 21, a GNSS receiver 22, and various sensors 23, and pieces of data detected thereby are received through the input and output interface.

The LiDAR 21 is an external observation device that measures a position and a distance of an object through use of reflected light of a laser beam emitted for irradiation. In place of the LiDAR 21, a camera (for example, distance image camera) capable of measuring a distance for each pixel may be used as the external observation device. A camera that does not measure a distance may also be employed as long as the electronic control unit 10 has a function of analyzing a distance of an object for each pixel from an image.

The GNSS receiver 22 is a positioning device that measures a position through use of signals transmitted from artificial satellites.

The sensors 23 are a vehicle speed sensor, a triaxial acceleration sensor that detects an attitude (roll, pitch, and yaw) of a vehicle, and the like. Output from those sensors 23 is used for converting coordinates of a peripheral object detected by the LiDAR 21 from a sensor coordinate system to an absolute coordinate system.

Figure 2:
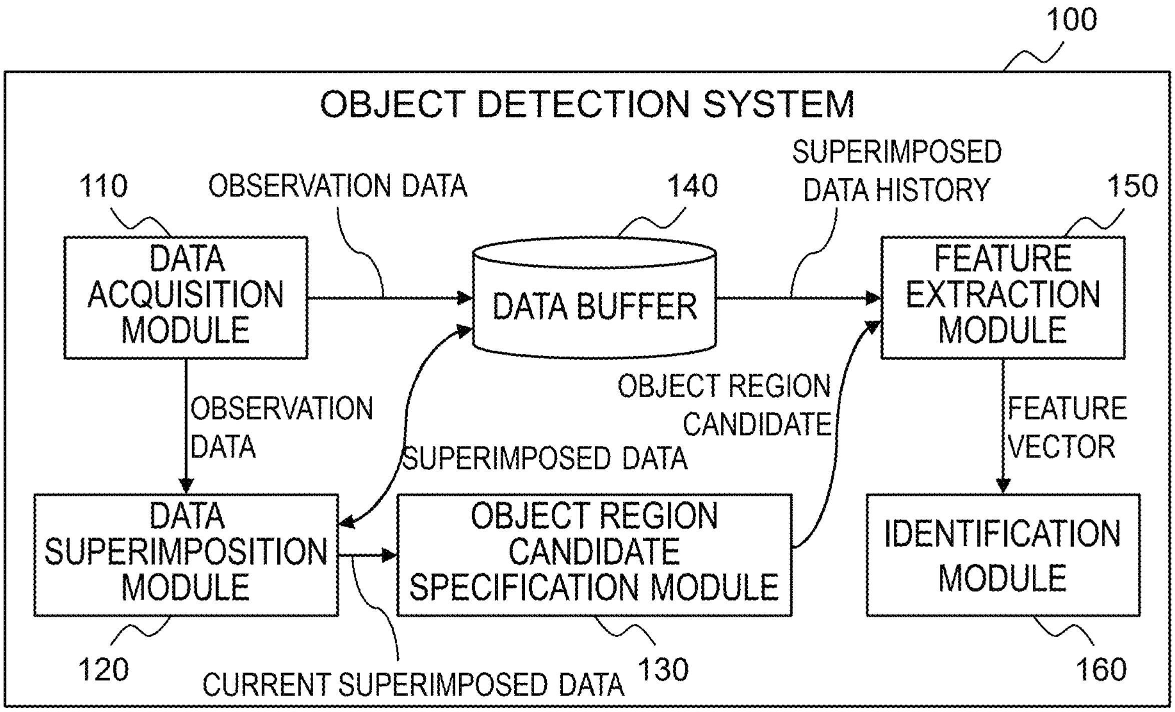
FIG. 2 is a block diagram for illustrating a logical configuration of an object detection system configured on the electronic control unit according to the first embodiment of this invention.

FIG. 2 is a block diagram for illustrating a logical configuration of an object detection system 100 configured on the electronic control unit 10 according to the first embodiment.

The object detection system 100 includes a data acquisition module 110, a data superimposition module 120, an object region candidate specification module 130, a data buffer 140, a feature extraction module 150, and an identification module 160.

The data acquisition module 110 acquires the observation data obtained through observation by the LiDAR 21, the GNSS receiver 22, and the sensors 23. For example, point cloud data on a peripheral object is input from the LiDAR 21, position information on latitude and longitude is input from the GNSS receiver 22, and information for use in coordinate conversion is input from the sensors 23. The observation data acquired by the data acquisition module 110 is sent to the data superimposition module 120, and is stored in the data buffer 140.

The data superimposition module 120 uses the observation results obtained by the sensors 23 to convert the point cloud data in a LIDAR coordinate system acquired by the LiDAR 21 into an absolute coordinate system, and creates superimposed data by superimposing past point cloud data corresponding to a time period of a predetermined time window. The superimposed data created by the data superimposition module 120 is sent to the object region candidate specification module 130, and is stored in the data buffer 140. The coordinate system is not required to be converted into the absolute coordinate system, and a relative coordinate system may be used without being converted, to thereby execute subsequent processing (feature amount extraction and object type identification) by tracking a point cloud through use of a tracking technology and associating observation points at different times with each other.

The object region candidate specification module 130 specifies an object region candidate having a high possibility of presence of an object from the superimposed point cloud data. The object region candidate specified by the object region candidate specification module 130 is sent to the feature extraction module 150.

The data buffer 140 is a data storage unit that stores the observation data acquired by the data acquisition module 110 and the superimposed data created by the data superimposition module 120. The data superimposition module 120 can acquire past superimposed data from the data buffer 140.

The feature extraction module 150 extracts a feature of the object based on the number of point clouds included in the selected object region candidate, and generates a feature vector representing the extracted feature.

The identification module 160 identifies, based on the feature vector generated by the feature extraction module 150, whether the object in the object region candidate is a stationary object or a moving object.

Figure 3:
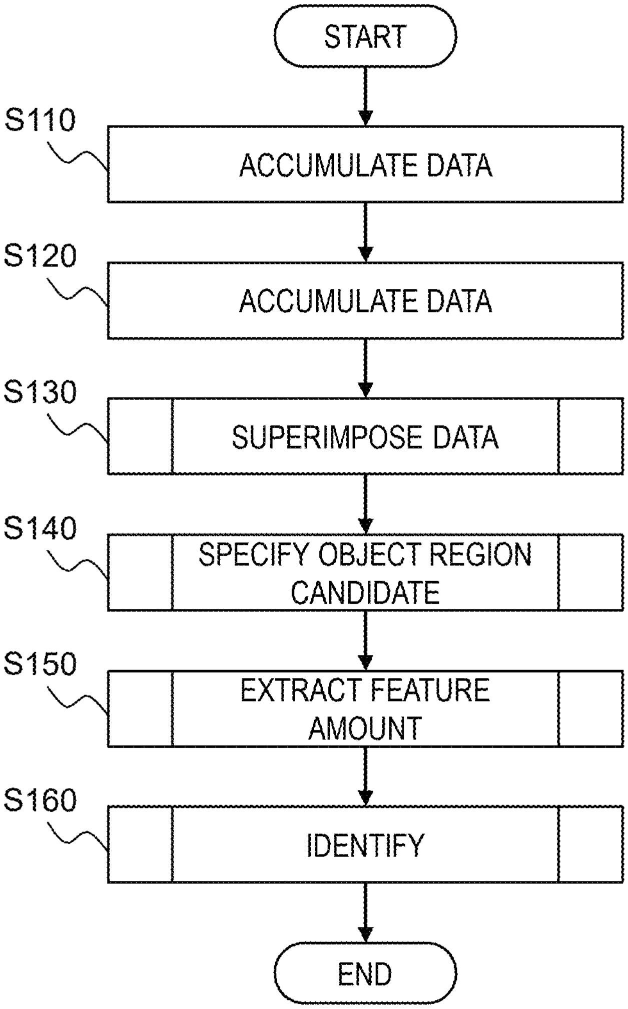
FIG. 3 is a flow chart of processing executed by the object detection system according to the first embodiment of this invention.

FIG. 3 is a flow chart of processing executed by the object detection system 100 in the first embodiment.

First, the data acquisition module 110 acquires point cloud data obtained through observation by the LiDAR 21 at a predetermined timing (for example, predetermined time interval) and the observation data obtained through observation by the GNSS receiver 22 and the sensors 23 at a predetermined timing (for example, predetermined time interval) (S110), and stores the acquired observation data in the data buffer 140 (S120).

Subsequently, the data superimposition module 120 uses the observation results obtained by the sensors 23 to convert the point cloud data in the LiDAR coordinate system acquired by the LiDAR 21 into an absolute coordinate system. Then, the data superimposition module 120 acquires the past observation data corresponding to the time period of the predetermined time window from the data buffer 140, and creates superimposed data in which the point cloud data corresponding to the time period of the predetermined time window is superimposed (S130).

Subsequently, the object region candidate specification module 130 specifies, from the superimposed point cloud data, an object region candidate having a possibility of presence of an object (S140).

Subsequently, the feature extraction module 150 extracts a feature of the object based on the number of point clouds included in an object region selected as a candidate, and generates a feature vector representing the extracted feature (S150).

Subsequently, the identification module 160 identifies, based on the feature vector generated by the feature extraction module 150, whether the object in the object region candidate is a stationary object or a moving object (S160).

Figure 4:
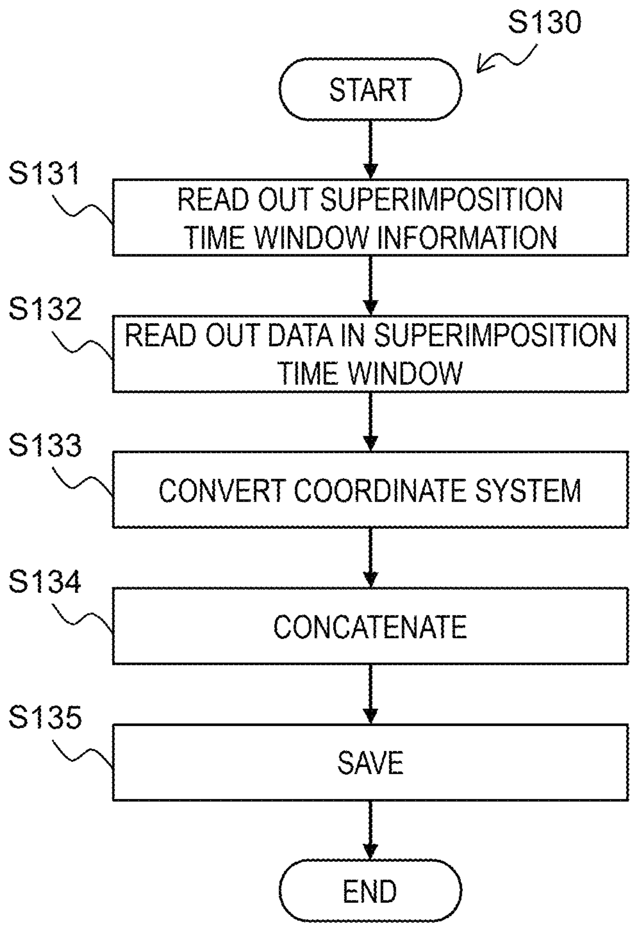
FIG. 4 is a flow chart of data superimposition processing executed by the data superimposition module according to the first embodiment of this invention.

FIG. 4 is a flow chart of data superimposition processing (S130) executed by the data superimposition module 120 in the first embodiment.

First, the data superimposition module 120 reads out superimposition time window information from a predetermined storage area of the memory 12 (S131). Subsequently, when the data superimposition module 120 detects that new point cloud data has been stored in the data buffer 140, the data superimposition module 120 reads out, from the data buffer 140, the observation results obtained by the sensors 23 and the point cloud data in a superimposition time window of the read-out superimposition time window information (S132). Subsequently, the data superimposition module 120 uses the observation results obtained by the sensors 23 to convert the point cloud data in the LiDAR coordinate system acquired by the LiDAR 21 into an absolute coordinate system (S133). Subsequently, the data superimposition module 120 concatenates the point cloud data converted into the absolute coordinate system, to thereby create superimposed data (S134). Subsequently, the data superimposition module 120 then saves the created superimposed data in the data buffer 140 (S135).

Figure 5:
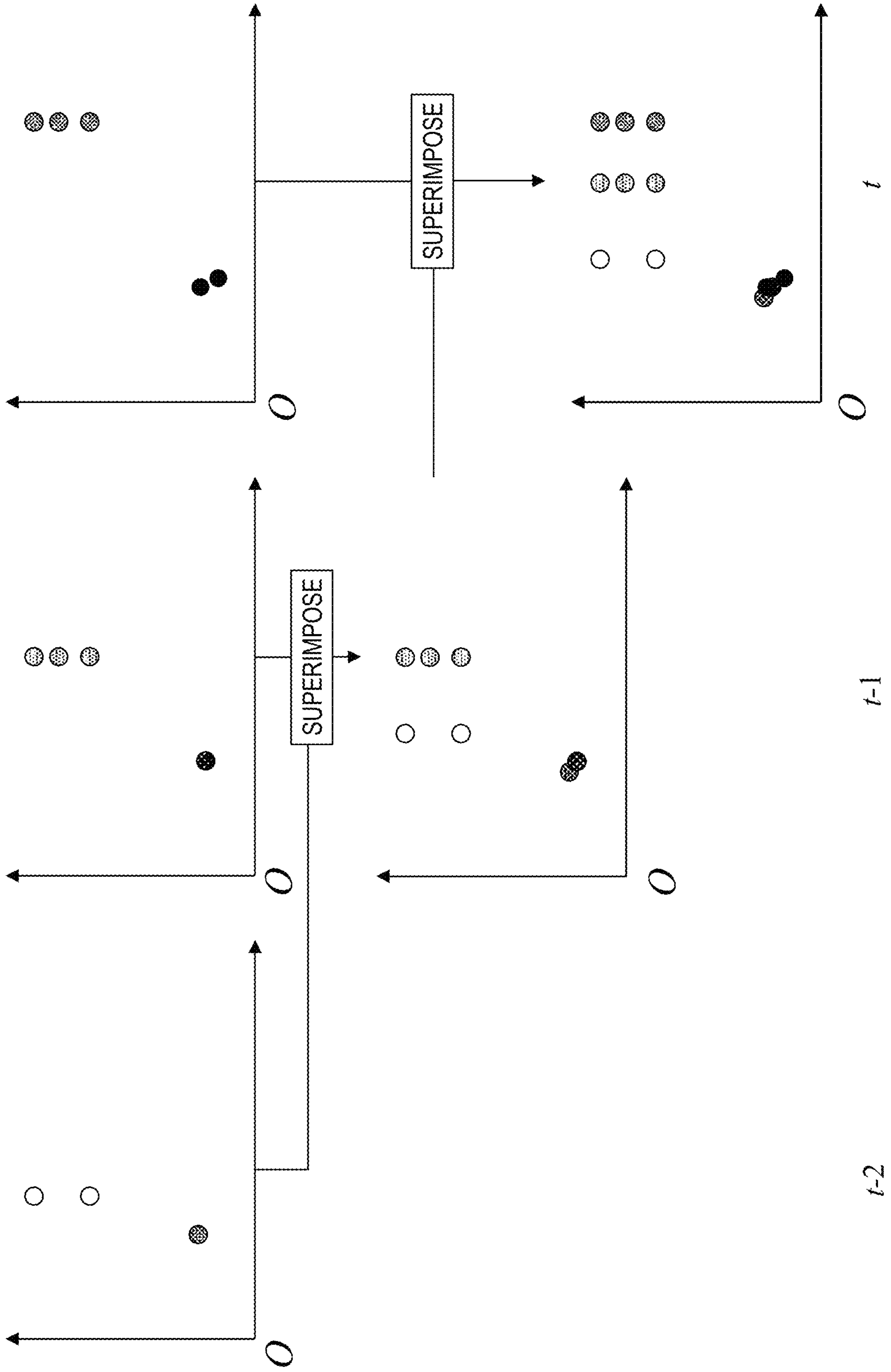
FIG. 5 is a diagram for illustrating a superimposition of point clouds according to the first embodiment of this invention.

As illustrated in FIG. 5, in the data superimposition processing (S130), when the superimposition time window has three frames, point clouds in three frames at a time t, a time t-1, and a time t-2 are superimposed. For example, as illustrated in FIG. 5, the point clouds in a frame at the time t may be superimposed onto the point clouds in two frames at the time t-2 and the time t-1 that have been first superimposed, or the point clouds in three frames at the time t, the time t-1, and the time t-2 may be superimposed at a time.

Figure 6:
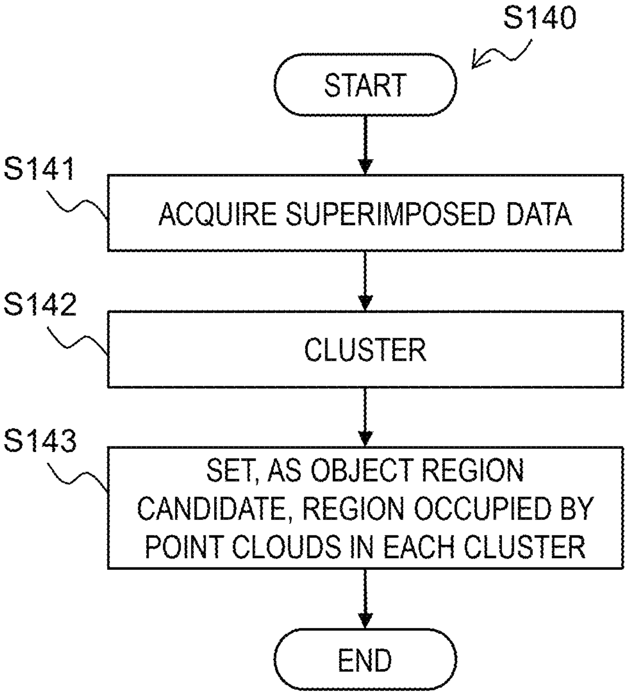
FIG. 6 is a flow chart of object region candidate specification processing executed by the object region candidate specification module according to the first embodiment of this invention.

FIG. 6 is a flow chart of object region candidate specification processing (S140) executed by the object region candidate specification module 130 in the first embodiment.

First, the object region candidate specification module 130 acquires the superimposed data from the data superimposition module 120 (S141). Subsequently, the object region candidate specification module 130 clusters point clouds (S142). Subsequently, the object region candidate specification module 130 determines whether or not a region occupied by the point clouds in each cluster has a possibility of presence of an object, and specifies a region having a possibility of presence of an object as an object region candidate (S143).

Figure 7:
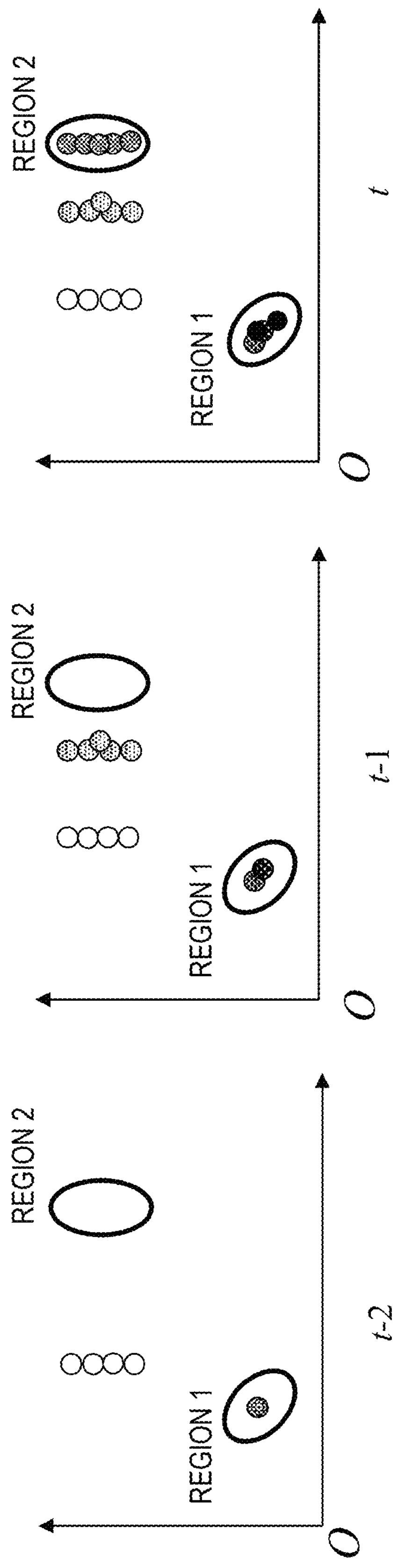
FIG. 7 is a diagram for illustrating clustering of point clouds according to the first embodiment of this invention.

For example, as illustrated in FIG. 7, at the time t after the superimposition of the point cloud data, object region candidates are determined by clustering the regions in which a large number of point clouds are gathered, and at the times t-1 and t-2 the point clouds at which have been superimposed onto the data at the time t, the object region candidates are placed at the same positions as those at the time t.

Figure 8:
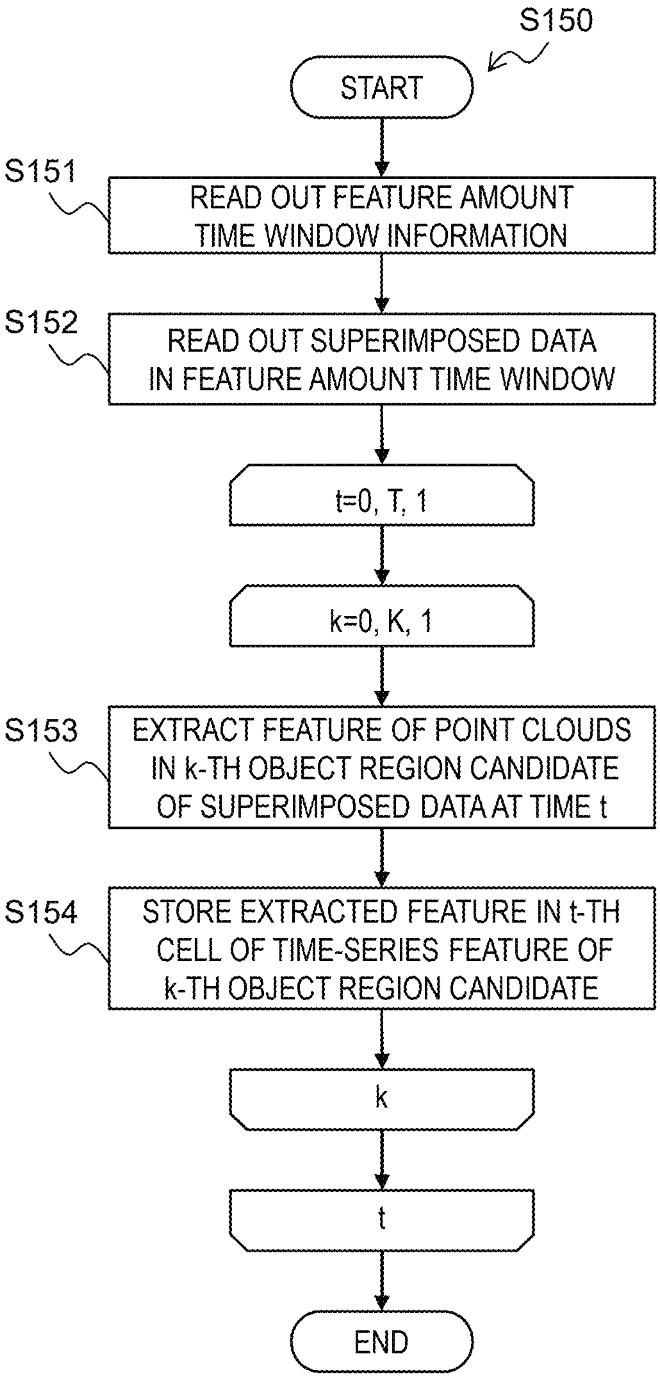
FIG. 8 is a flow chart of feature amount extraction processing according to the first embodiment of this invention.

FIG. 8 is a flow chart of feature amount extraction processing (S150) executed by the feature extraction module 150 in the first embodiment.

First, the feature extraction module 150 reads out feature amount time window information from a predetermined storage area of the memory 12 (S151), and reads out the superimposed data in a feature amount time window of the read-out feature amount time window information from the data buffer 140 (S152).

Figure 9:
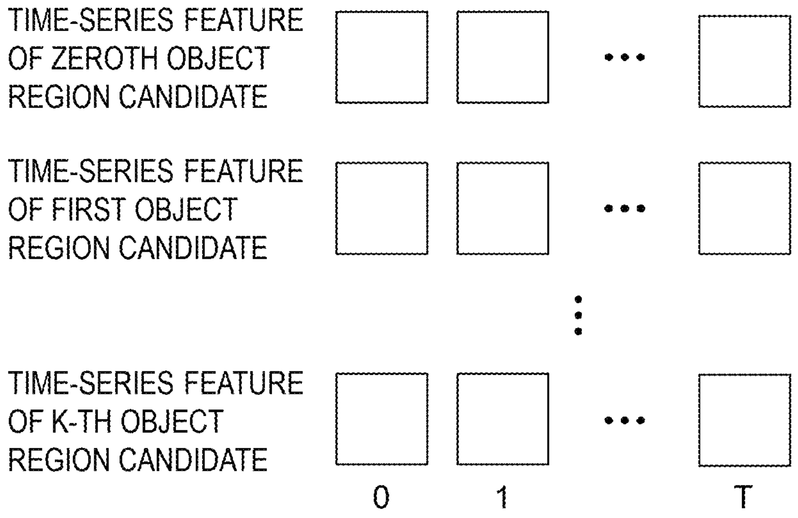
FIG. 9 is a diagram for illustrating a feature amount vector in which storage areas of feature amounts is configured in a matrix manner according to the first embodiment of this invention.

Subsequently, the feature extraction module 150 repeatedly executes the processing steps of Step S153 and Step S154 while changing the parameter t by one from 0 to T and changing a parameter k by one from 0 to K. In Step S153, the feature extraction module 150 extracts the feature of the point clouds in a k-th object region candidate of the superimposed data at the time t. Subsequently, the feature extraction module 150 stores the extracted feature in a t-th cell of a time-series feature of the k-th object region candidate (S154). As a feature amount, as illustrated in FIG. 9, storage areas of the feature amounts of the parameter k at the time t are preferred to be configured in a matrix manner to form a feature amount vector.

Figure 10:
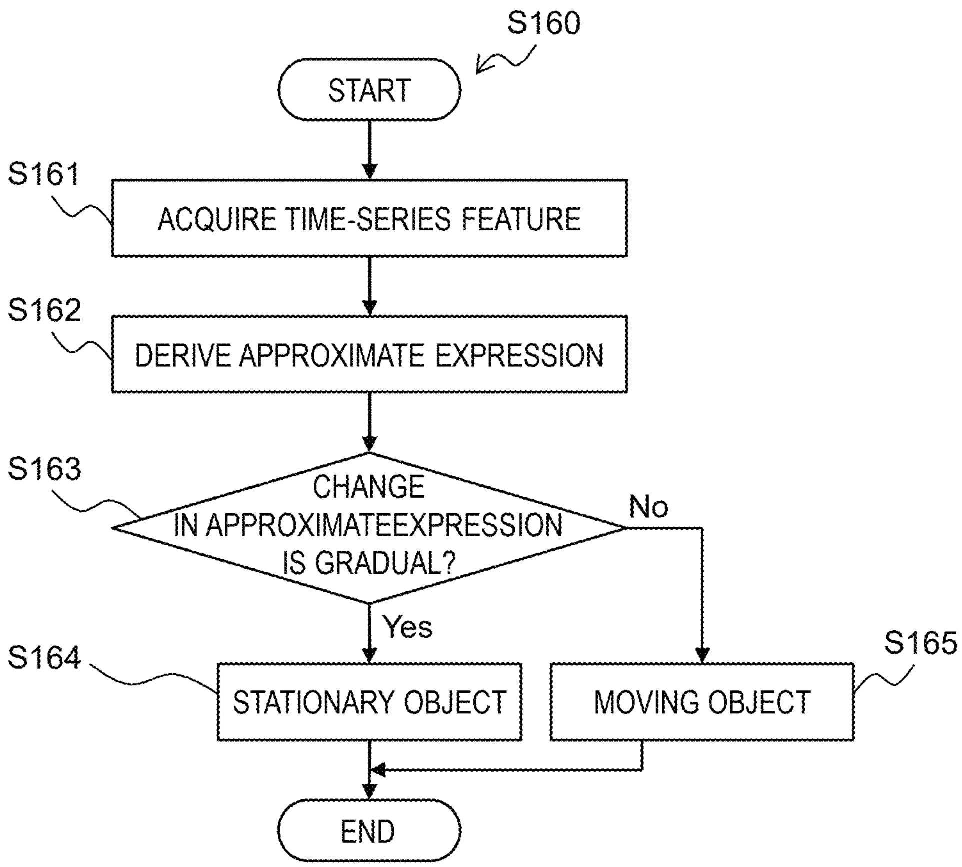
FIG. 10 is a flow chart of identification processing executed by the identification module according to the first embodiment of this invention.

FIG. 10 is a flow chart of identification processing (S160) executed by the identification module 160 in the first embodiment.

First, the identification module 160 acquires a feature-vectorized time-series feature (S161). Subsequently, the identification module 160 derives an approximate expression representing the acquired time-series feature (S162). As the approximate expression, an approximate expression of a linear approximation can be used. Further, a parameter of the approximate expression may be changed depending on a calculation capacity of the electronic control unit 10, accuracy expected by an application, a traveling environment, and the number of clusters.

Figure 11:
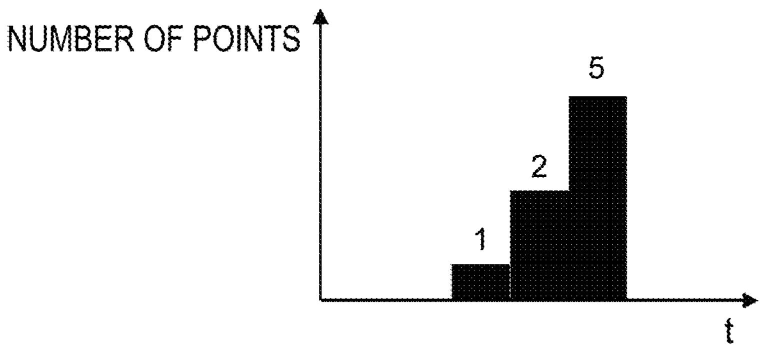
FIG. 11 is a diagram for illustrating the number of points in a region in which a stationary object is present according to the first embodiment of this invention.
Figure 12:
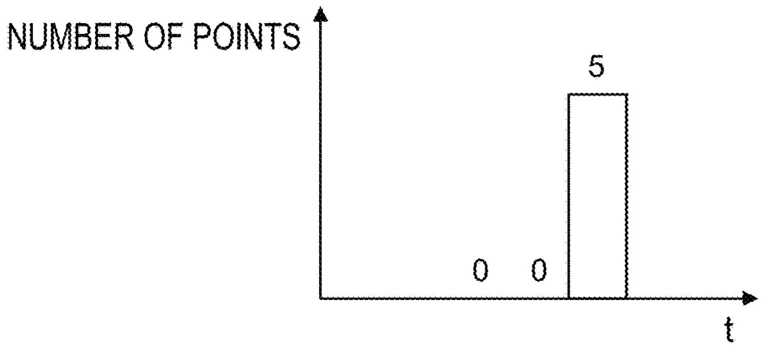
FIG. 12 is a diagram for illustrating the number of points in a region in which a moving object is present according to the first embodiment of this invention.

Subsequently, the identification module 160 determines whether or not a change in the approximate expression is gradual (S163). It is possible to determine whether or not the change is gradual by comparing, for example, when the approximate expression is expressed by a linear approximation, a slope representing the linear approximate expression to a predetermined threshold value. When the change in the number of points in the object region candidate represented by the approximate expression is gradual, the object region candidate is identified as detecting a stationary object (S164). Meanwhile, when the change in the number of points in the object region candidate represented by the approximate expression is abrupt, the object region candidate is identified as detecting a moving object (S165). For example, as shown in FIG. 11, the number of points in a region 1 in which a stationary object is present gradually increases with a lapse of time. Meanwhile, as shown in FIG. 12, the number of points in a region 2 in which a moving object is present abruptly increases at a specific time (normally, the number abruptly drops after a predetermined time period required for passage of the moving object). While the number of points in a region varies depending on the size of an object, the amount of change in the number of points depending on the size of an object is small, and hence the object is accurately identified by the amount of change in the number of points in the region.

As described above, according to the first embodiment of this invention, even a distant object having sparse point clouds can be accurately identified as a stationary object or a moving object. In other words, point clouds of long-distance observation results are sparse, and hence it is difficult to detect a distant object, thereby causing difficulty in identifying a type of the object. Meanwhile, when over-detection is permitted, an object that is not actually present may be adversely detected to frequently cause deceleration or sudden stop, thereby causing deterioration in fuel efficiency or ride comfort and resulting in a risk of rear-end collision of the following vehicle. According to the first embodiment, it is possible to accurately identify whether the observed object is a stationary object or a moving object, and to accurately determine the type (for example, falling object, vehicle, or structure) of the object.

In particular, in the state of the art as of the filing of the patent application, an interval at which the LiDAR 21 emits a laser beam for irradiation is about 0.1 degrees, and an irradiation interval of about 26 centimeters is obtained at a vertical plane of 150 meters ahead. In addition, the irradiation interval at the road surface becomes longer. Therefore, in order to observe and identify an object at a far distance of such a degree by the LiDAR, as in the first embodiment, an object identification method based on a change in a feature of a point cloud region on which point clouds are superimposed is suitable.

Second Embodiment

Next, a second embodiment of this invention is described. In the second embodiment, the superimposition time window is set to be variable. In the second embodiment, differences from the first embodiment are mainly described, and description of the same configuration and processing is omitted.

Figure 13:
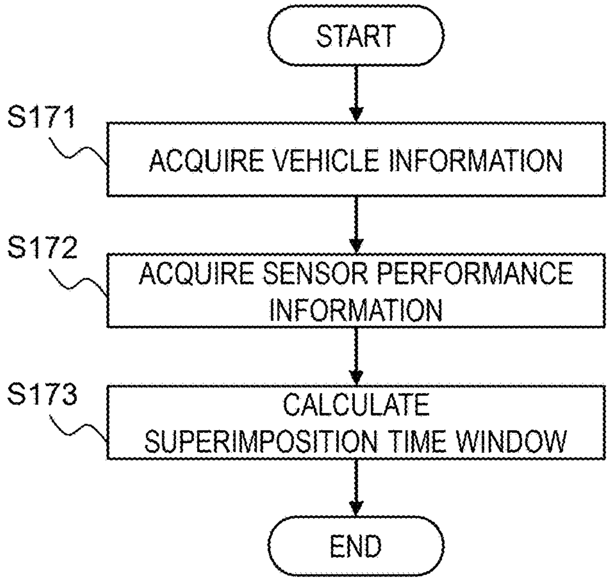
FIG. 13 is a flow chart of point cloud superimposition time window calculation processing according to a second embodiment of this invention.

FIG. 13 is a flow chart of point cloud superimposition time window calculation processing in the second embodiment.

In the point cloud superimposition time window calculation processing, superimposition time window information to be read out from the predetermined storage area of the memory 12 in the data superimposition processing (S130) is generated.

First, the data superimposition module 120 acquires vehicle information indicating performance required by devices mounted to a vehicle (S171), and acquires sensor performance information indicating performance of the sensors 23 mounted to the vehicle (S172). Subsequently, the data superimposition module 120 calculates a point cloud superimposition time window based on the acquired sensor information (S173). For example, the distance of an object to be detected and the type (moving object or stationary object) of the object to be detected differ depending on in-vehicle devices and the performance of the sensors 23 mounted to the vehicle also differs, and hence it is preferred to cause the performance of the sensors 23 and the performance required by the in-vehicle devices to match each other by setting the point cloud superimposition time window to be variable.

In this manner, according to the second embodiment, the time window corresponding to the performance of the sensors 23 can be set by changing the time window for superimposing the point clouds, and it is possible to improve object identification accuracy and reduce excessive processing.

The point cloud superimposition time window calculation processing may be executed by being called from the data superimposition processing (S130) or may be executed at a predetermined timing different from that of the data superimposition processing (S130).

Third Embodiment

Next, a third embodiment of this invention is described. In the third embodiment, the object region candidate is specified through use of grid division. In the third embodiment, differences from the first embodiment are mainly described, and description of the same configuration and processing is omitted.

Figure 14:
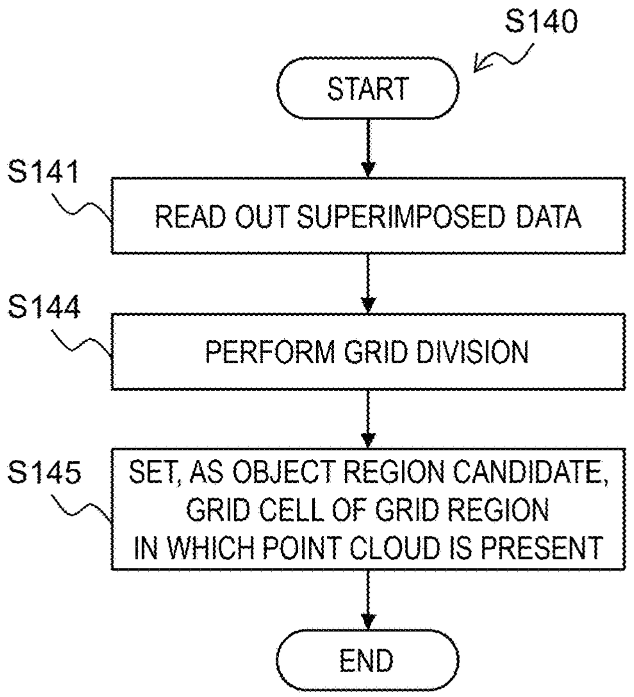
FIG. 14 is a flow chart of object region candidate specification processing according to a third embodiment of this invention.

FIG. 14 is a flow chart of the object region candidate specification processing (S140) executed by the object region candidate specification module 130 in the third embodiment.

First, the object region candidate specification module 130 acquires the superimposed data from the data superimposition module 120 (S141). Subsequently, the object region candidate specification module 130 divides an observation region in which point clouds are to be detected into grid cells each having a predetermined size (S144). Subsequently, the object region candidate specification module 130 specifies a grid cell of a grid region in which a point cloud is present as an object region candidate being a region having a high possibility of presence of an object (S145). In Step S145, a threshold value of the number of points in the grid cell to be determined as the object region candidate may be set to 1, or may be set to a predetermined number equal to or larger than 2.

In this manner, according to the third embodiment, it is possible to specify the object region candidate without executing clustering processing that requires a computer resource. It is also possible to specify the object region candidate without depending on clustering accuracy. In addition, the grid division has satisfactory compatibility with an occupancy grid map, and the observation results can be used for calculation of an occupancy rate of the grid map.

Fourth Embodiment

Next, a fourth embodiment of this invention is described. In the fourth embodiment, the object region candidate is specified through use of a deep neural network (DNN). In the fourth embodiment, differences from the first embodiment are mainly described, and description of the same configuration and processing is omitted.

Figure 15:
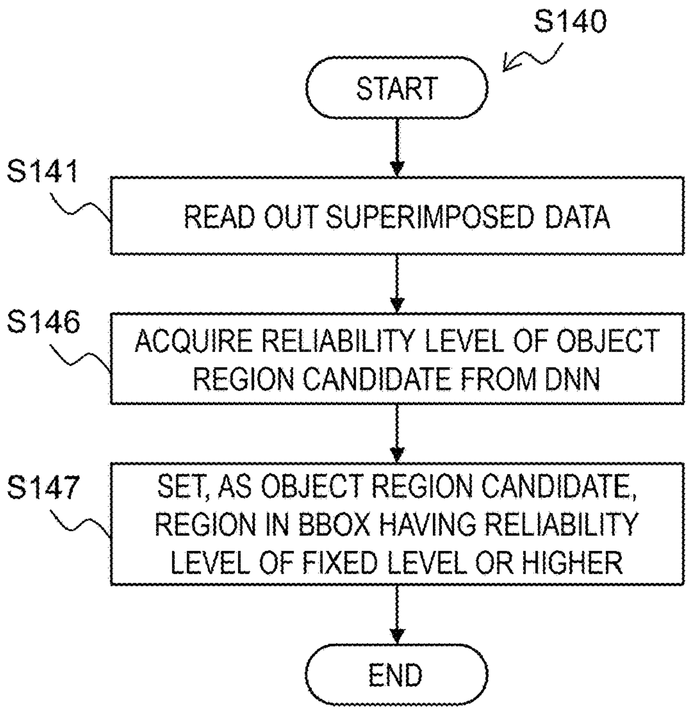
FIG. 15 is a flow chart of object region candidate specification processing according to a fourth embodiment of this invention.

FIG. 15 is a flow chart of the object region candidate specification processing (S140) executed by the object region candidate specification module 130 in the fourth embodiment.

First, the object region candidate specification module 130 acquires the superimposed data from the data superimposition module 120 (S141). Subsequently, the object region candidate specification module 130 acquires a reliability level of each of object region candidates (bounding boxes) through use of a DNN that has learned presence or absence of an object in each object region and each point cloud (S146). The DNN for object detection estimates, from the point cloud data, an area (bounding box) of an object present in the point cloud data and a category or presence or absence of the object. For example, a model as disclosed in "PointPillars: Fast Encoders for Object Detection from Point Clouds," Alex H. Lang, et al., Conference: 2019 IEEE/CVF Conference on Computer Vision and Pattern Recognition (CVPR), June 2019 can be used as the DNN for object detection. Subsequently, the object region candidate specification module 130 compares the reliability level output from the DNN to a predetermined threshold value to leave the object region candidate having a higher reliability level and excludes the object region candidate having a lower reliability level from candidates (S147).

In this manner, according to the fourth embodiment, the DNN is used to specify the object region candidate, and hence, even in an environment including large noise, it is possible to specify the object region candidate with higher accuracy than in a case of clustering and to identify the object with higher accuracy.

Fifth Embodiment

Next, a fifth embodiment of this invention is described. In the fifth embodiment, the object is identified by limiting the range. In the fifth embodiment, differences from the first embodiment are mainly described, and description of the same configuration and processing is omitted.

Figure 16:
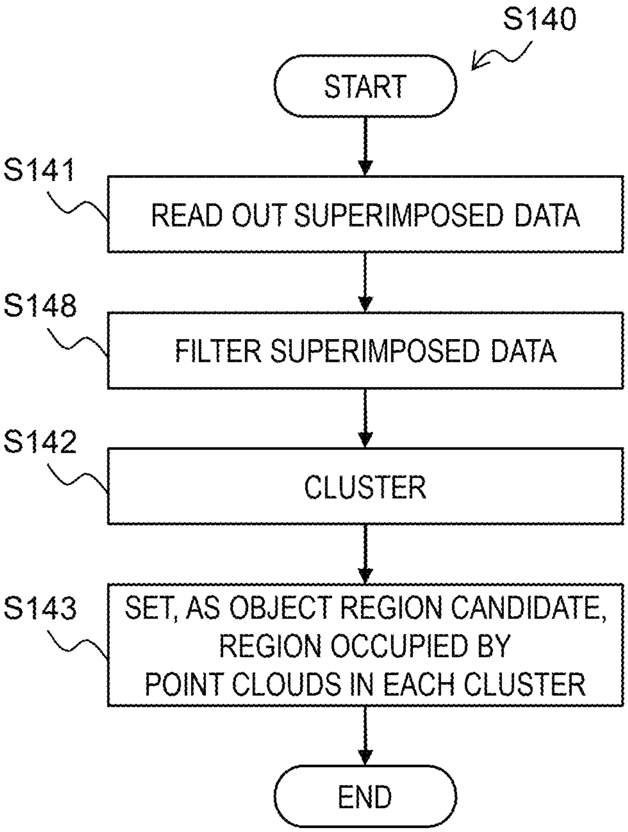
FIG. 16 is a flow chart of object region candidate specification processing according to a fifth embodiment of this invention.

FIG. 16 is a flow chart of the object region candidate specification processing (S140) executed by the object region candidate specification module 130 in the fifth embodiment.

First, the object region candidate specification module 130 acquires the superimposed data from the data superimposition module 120 (S141). Subsequently, the object region candidate specification module 130 filters the superimposed point cloud data to select point cloud data having a specific range (S148). The specific range can be variously selected depending on usage of information on an identified object from among, for example, a far distance, a periphery of a track being planned, and the like. Subsequently, the object region candidate specification module 130 clusters the filtered point clouds (S142). Subsequently, the object region candidate specification module 130 sets a region occupied by the point clouds in each cluster as an object region candidate having a high possibility of presence of an object (S143).

In the fifth embodiment, an example in which the clustering is used in Step S142 has been described, but the grid division in the third embodiment or the DNN in the fourth embodiment may also be used.

In addition, unlike the observation results obtained by the LiDAR, a camera image has pixels present over an entire observed region. Therefore, pixels filtered with a limited distance can be handled in the same manner as the point clouds in the fifth embodiment, and this invention can be suitably applied to the camera image according to the fifth embodiment.

In this manner, according to the fifth embodiment, the point cloud data selected by the filtering is used to specify the object region candidate, and hence an object is identified within a specific range. With this configuration, an object can be identified by excluding a region having a low relevance to vehicle control, thereby being able to suppress overdetection and to improve object identification accuracy. For example, in a case of identifying the periphery of a track being planned, it is not required to process an object (point clouds) outside a track such as a guardrail, thereby being able to suppress overdetection.

Sixth Embodiment

Next, a sixth embodiment of this invention is described. In the sixth embodiment, the feature amount time window is set to be variable. In the sixth embodiment, differences from the first embodiment are mainly described, and description of the same configuration and processing is omitted.

Figure 17:
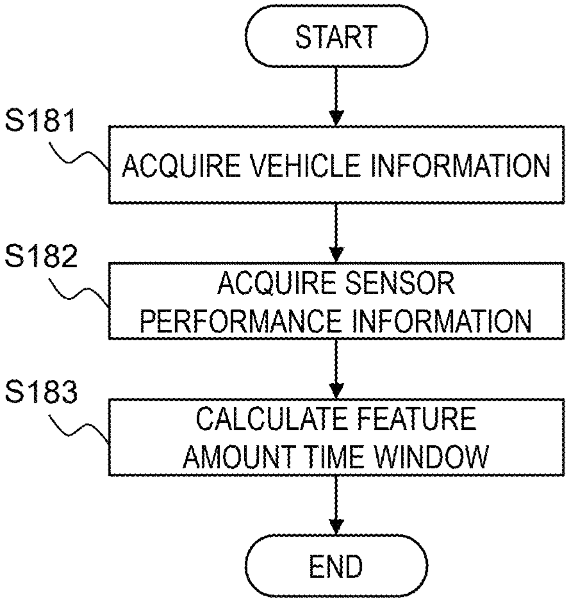
FIG. 17 is a flow chart of feature amount time window calculation processing according to a sixth embodiment of this invention.

FIG. 17 is a flow chart of feature amount time window calculation processing in the sixth embodiment.

In the feature amount time window calculation processing, feature amount time window information to be read out from the predetermined storage area of the memory 12 in the feature amount extraction processing (S150) is generated.

First, the feature extraction module 150 acquires vehicle information indicating performance required by devices mounted to a vehicle (S181). Subsequently, the feature extraction module 150 acquires sensor performance information indicating performance of the sensors 23 mounted to the vehicle (S182). Subsequently, the feature extraction module 150 calculates the feature amount time window based on the acquired sensor information (S183). For example, the distance of an object to be detected and the type (moving object or stationary object) of the object to be detected differ depending on in-vehicle devices and the performance of the sensors 23 mounted to the vehicle also differs, and hence it is preferred to cause the performance of the in-vehicle sensors 23 and the performance required by the in-vehicle devices to match each other by setting the feature amount time window to be variable.

In addition, in a case of identifying an object present at a distance, a time window for superimposing the feature amount is preferred to be set larger (that is, the number of image frames to be used for superimposition processing is preferred to be set larger) than in a case of identifying an object present in a vicinity of an own vehicle. Further, the filtering of the point cloud data on an object at a far distance in the fifth embodiment described above may be used in combination to suppress an increase in arithmetic processing while improving identification accuracy of an object present at a distance.

In this manner, according to the sixth embodiment, the time window corresponding to the performance of the sensors 23 can be set by changing the time window for extracting the feature amount, and it is possible to improve object identification accuracy and reduce excessive processing.

The feature amount time window calculation processing may be executed by being called from the feature amount extraction processing (S150) or may be executed at a predetermined timing different from that of the feature amount extraction processing (S150).

Seventh Embodiment

Next, a seventh embodiment of this invention is described. In the seventh embodiment, an object is identified through use of features other than the number of points in the object region candidate. In the seventh embodiment, differences from the first embodiment are mainly described, and description of the same configuration and processing is omitted.

Figure 18:
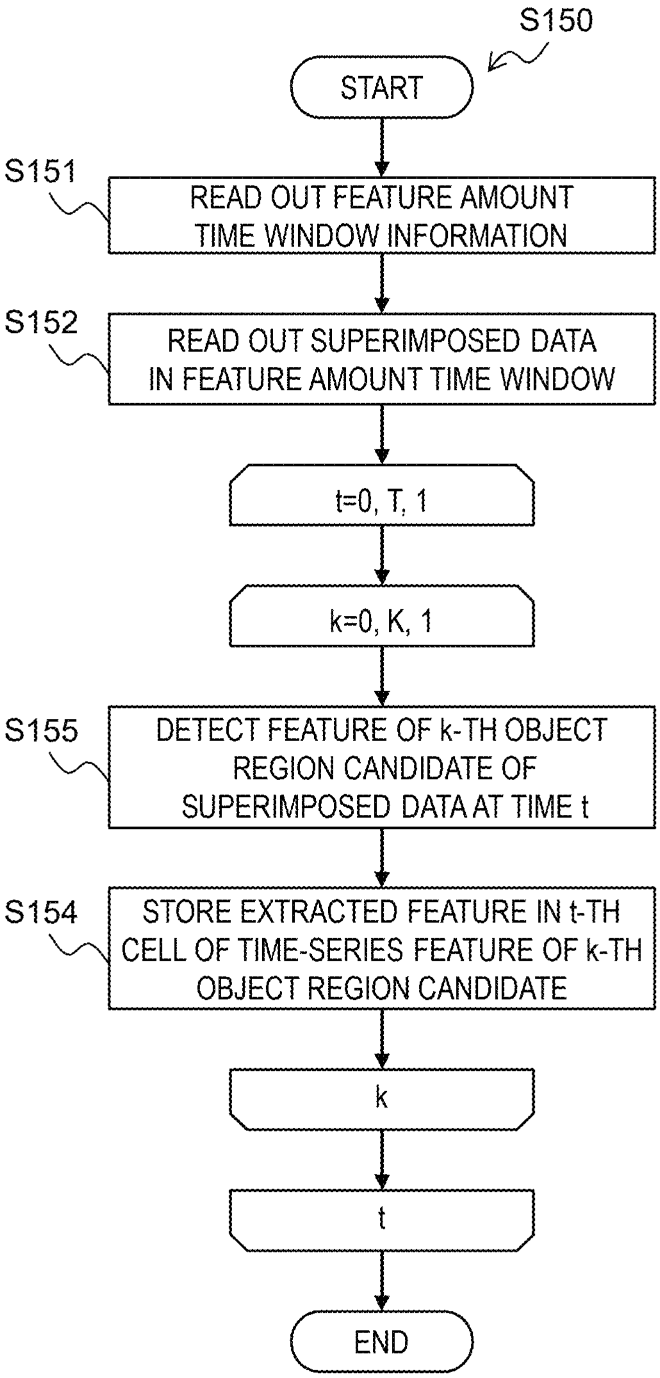
FIG. 18 is a flow chart of feature amount extraction processing according to a seventh embodiment of this invention.

FIG. 18 is a flow chart of feature amount extraction processing (S150) executed by the feature extraction module 150 in the seventh embodiment.

First, the feature extraction module 150 reads out feature amount time window information from a predetermined storage area of the memory 12 (S151), and reads out the superimposed data in a feature amount time window of the read-out feature amount time window information from the data buffer 140 (S152).

Subsequently, the feature extraction module 150 repeatedly executes the processing steps of Step S155 and Step S156 while changing the parameter t by one from 0 to T and changing the parameter k by one from 0 to K. In Step S155, the feature extraction module 150 detects the feature in a k-th object region candidate of the superimposed data at the time t. For example, in place of the number of points in the object region candidate, a point cloud density or the shape or area of the object region candidate is detected as the feature. Subsequently, the feature extraction module 150 stores the extracted feature in a t-th cell of a time-series feature of the k-th object region candidate (S156). As a feature amount, as illustrated in FIG. 9, storage areas of the feature amounts of the parameter k at the time t are preferred to be configured in a matrix manner.

The feature amount extraction processing in the seventh embodiment may be applied in place of the feature amount extraction processing (FIG. 8) in the first embodiment described above, or may be applied together with the feature amount extraction processing (FIG. 8) in the first embodiment. When an object is identified by two or more types of feature amounts, object identification accuracy can be improved.

In this manner, according to the seventh embodiment, an object is identified with attention being given to another feature amount of the object region candidate in place of or together with the number of points in the object region candidate, thereby being able to improve object identification accuracy.

Eighth Embodiment

Next, an eighth embodiment of this invention is described. In the eighth embodiment, in place of the linear approximation, approximate expressions to which various approximations, such as a polynomial approximation, a Fourier series, an exponential approximation, and a support vector regression, are applied are used to identify an object. In the eighth embodiment, differences from the first embodiment are mainly described, and description of the same configuration and processing is omitted.

Figure 19:
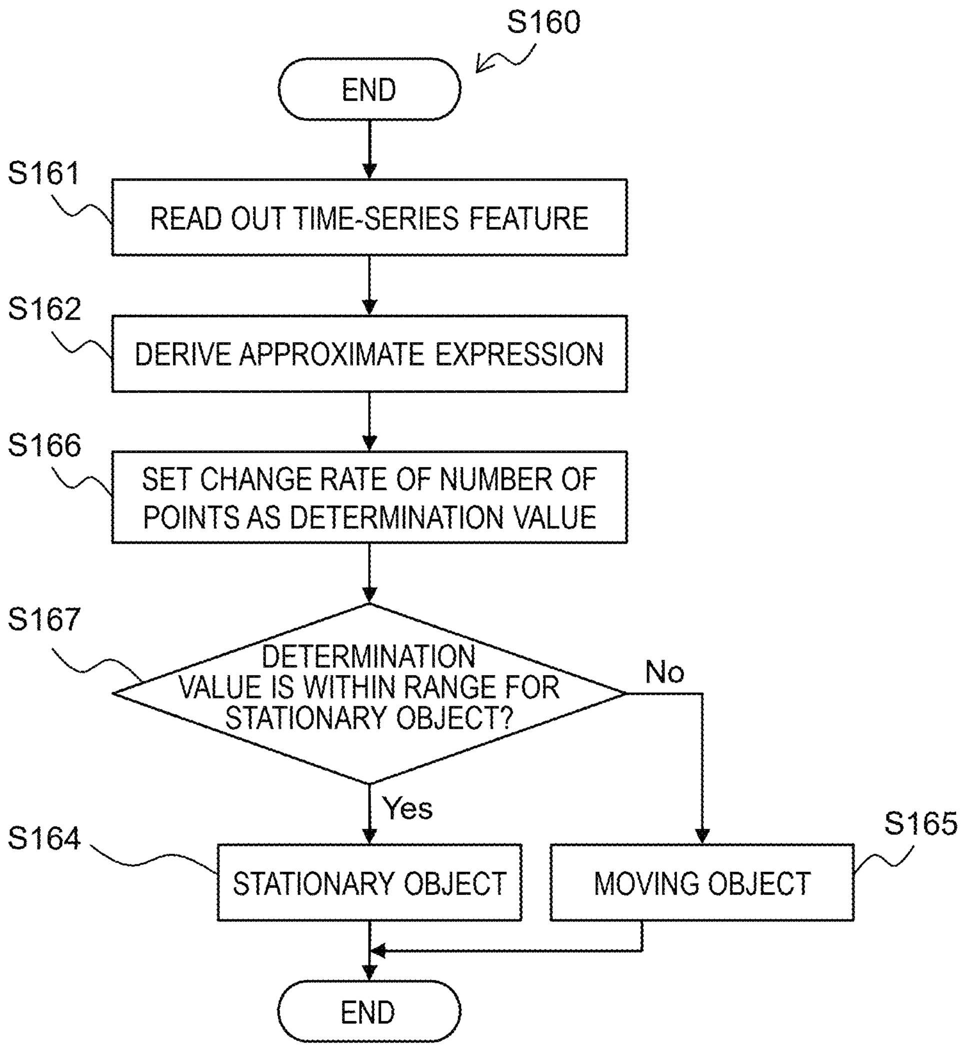
FIG. 19 is a flow chart of the identification processing according to a eighth embodiment of this invention.

FIG. 19 is a flow chart of the identification processing (S160) executed by the identification module 160 in the eighth embodiment.

First, the identification module 160 acquires a feature-vectorized time-series feature (S161). Subsequently, the identification module 160 derives an approximate expression representing the acquired time-series feature (S162). As the approximate expression, in addition to the linear approximation in the first embodiment, it is possible to use approximate expressions to which various approximations, such as a polynomial approximation, a Fourier series, an exponential approximation, and a support vector regression, are applied in the eighth embodiment. The approximate expression may also be changed depending on the calculation capacity of the electronic control unit 10, the accuracy expected by an application, the traveling environment, and the number of clusters. For example, on a road having many irregularities, the attitude of the vehicle frequently changes greatly, with the result that accuracy of the coordinate conversion deteriorates and the noise increases. Therefore, improvement in accuracy is not expected even through use of the Fourier series, and it is preferred to use the polynomial approximation having a small amount of calculation. Meanwhile, when the number of point clouds is small and each cluster has a small size, an approximate expression based on the Fourier series is preferred to be used to improve the accuracy. When a small stationary object is present at a far distance, a laser irradiation interval of the LIDAR is large, and hence an observation point for the small stationary object appears or disappears in each frame or repeatedly increases or decreases. This repetition cycle is determined by a distance between the object and the vehicle, a vehicle speed, the size of the object, and sensor performance, and a feature thereof can be extracted by utilizing frequency analysis.

Subsequently, the identification module 160 sets the feature amount of the object region candidate as a determination value (S166), and compares the set determination value to a predetermined condition for determination (S167). For example, a cluster area can be used as the determination value. When the object is within a range of the determination value within which the object is considered as a stationary object, the object region candidate is identified as detecting a stationary object (S164). Meanwhile, when the object is not within the range of the determination value within which the object is considered as a stationary object, the object region candidate is identified as detecting a moving object (S165).

For example, the Fourier series may be used to capture, as a feature, a periodic change in the number of points in the object region candidate, and to determine, based on a frequency spectrum representing periodicity of the change in the number of points, whether the object present in the object region candidate is a stationary object or a moving object.

The identification processing in the eighth embodiment can be executed in place of the identification processing in the first embodiment or together with the identification processing in the first embodiment.

In this manner, according to the eighth embodiment, object recognition accuracy can be improved based on a more detailed change in the object region candidate.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. An electronic control unit, comprising:

an arithmetic unit configured to execute predetermined processing; and a storage device that is accessible to the arithmetic unit; the electronic control unit includes a data acquisition module in which the arithmetic unit is configured to acquire external environment data obtained through observation by an external observation device;

a data storage module configured to accumulate the external environment data;

a data superimposition module in which the arithmetic unit is configured to superimpose pieces of external environment data at a plurality of times, which have been stored in the data storage unit;

an object region candidate specification module in which the arithmetic unit is configured to specify a candidate for a region in which an object is present in the superimposed pieces of external environment data;

a feature extraction module in which the arithmetic unit is configured to extract a feature of the specified candidate for the region in a feature amount time window including at least adjacent three times; and an identification module in which the arithmetic unit is configured to identify a peripheral object based on a variation with time in the extracted feature, wherein the identification module is configured to compare the variation with time in the feature of the region to a predetermined threshold value and identify the object in the region based on whether a change in the feature of the region is gradual.

2. The electronic control unit according to claim 1, wherein the object region candidate specification module is configured to specify the candidate for the region in which an object is present through use of the external environment data on the object present in a specific range.

3. The electronic control unit according to claim 2, wherein the object region candidate specification module is configured to specify the candidate for the region in which an object is present through use of the external environment data on the object present at a distance.

4. The electronic control unit according to claim 1, wherein the feature extraction module is configured to set, in a case of identifying an object present at a distance, a time period of the feature amount time window to be longer.

5. The electronic control unit according to claim 1, wherein the identification module is configured to set the number of points observed in a region as the feature of the region to compare, between pieces of data at a plurality of times, the number of points in a region at the same position as a position of a region in which a point cloud was detected at a certain time, and determine that the object in the region is a stationary object when a change in the number of points in the region is gradual.

6. The electronic control unit according to claim 1, wherein the external observation device comprises a device configured to detect an object as a point cloud based on reflection of a laser beam emitted for irradiation, and wherein the electronic control unit is configured to identify the object based on point cloud data obtained through detection by the external observation device.

7. The electronic control unit according to claim 1, wherein the external observation device is a camera, and wherein the electronic control unit is configured to identify the object based on pixel data obtained through photographing by the external observation device.

8. The electronic control unit according to claim 1, wherein the identification module is configured to set an area of a point cloud representing an object as the feature of the region to identify the object in the region based on a change in the area of the point cloud.

9. The electronic control unit according to claim 1, wherein the identification module is configured to identify, based on the feature in a periodic change in the number of points in the region, which one of a stationary object and a moving object the object present in the region is.

10. An object identification method to be executed by an electronic control unit, the electronic control unit including an arithmetic unit configured to execute predetermined processing, and a storage device that is accessible to the arithmetic unit, the object identification method comprising:

a step of acquiring, by the arithmetic unit, external environment data obtained through observation by an external observation device, and accumulating the external environment data in the storage device;

a step of superimposing, by the arithmetic unit, pieces of external environment data at a plurality of times, which have been stored in the storage device;

a step of specifying, by the arithmetic unit, a candidate for a region in which an object is present in the superimposed pieces of external environment data;

a step of extracting, by the arithmetic unit, a feature of the specified candidate for the region in a feature amount time window including at least adjacent three times; and a step of identifying, by the arithmetic unit, a peripheral object based on a variation with time in the extracted feature, wherein in the step of identifying, the peripheral object includes a step of comparing, by the arithmetic unit, the variation with time in the feature of the region to a predetermined threshold value and identifying the object in the region based on whether a change in the feature of the region is gradual.

* * * * *